United States Patent [19]

Asanuma

[11] Patent Number: 4,754,992
[45] Date of Patent: Jul. 5, 1988

[54] INDEPENDENT REAR SUSPENSION FOR USE OF MOTOR VEHICLES

[75] Inventor: Nobuyoshi Asanuma, Saitama, Japan

[73] Assignee: Honda Giken Kogyo Kabushiki Kaisha, Tokyo, Japan

[21] Appl. No.: 868,809

[22] Filed: May 29, 1986

[30] Foreign Application Priority Data

Jun. 3, 1985 [JP] Japan .................................. 60-120244

[51] Int. Cl.⁴ ............................................... B60G 3/00
[52] U.S. Cl. ..................................... 280/690; 280/701
[58] Field of Search ................ 280/688, 690, 700, 701

[56] References Cited

U.S. PATENT DOCUMENTS

| | | | |
|---|---|---|---|
| 4,456,282 | 6/1984 | Rumpel | 280/690 |
| 4,650,209 | 3/1987 | Sumimoto | 280/701 |

FOREIGN PATENT DOCUMENTS

| | | | |
|---|---|---|---|
| 83206 | 7/1983 | European Pat. Off. | 280/701 |
| 2038880 | 2/1972 | Fed. Rep. of Germany | 280/701 |
| 698921 | 12/1965 | Italy | 280/701 |
| 116513 | 6/1985 | Japan | 280/690 |

Primary Examiner—Ross Weaver
Attorney, Agent, or Firm—Irving M. Weiner; Joseph P. Carrier; Pamela S. Burt

[57] ABSTRACT

An independent rear suspension for use on a motor vehicle having a vehicle body includes a knuckle for supporting a wheel rotatably thereon, a trailing arm having one end rigidly coupled to the knuckle and the opposite end adapted to be pivotally mounted on the vehicle body for pivotal movement about a first pivot, a pair of spaced lower arms pivotally mounted on the knuckle, a knuckle arm extending substantially upwardly from the knuckle, and an upper arm having one end pivotally mounted on the knuckle arm by a ball-and-socket joint and the opposite end adapted to be pivotally mounted on the vehicle body for pivotal movement about a second pivot, the second pivot having a central axis, the extension of which passes substantially through the first pivot. The aforesaid one end of the upper arm has a third pivot about which it is pivotally movable, the third pivot having a central axis, the extension of which is substantially parallel to the extension of the central axis of the second pivot.

2 Claims, 2 Drawing Sheets

INDEPENDENT REAR SUSPENSION FOR USE OF MOTOR VEHICLES

BACKGROUND OF THE INVENTION

1. Field of the Invention:

The present invention relates to an independent rear suspension including a trailing arm, for use on a motor vehicle.

2. Description of the Relevant Art:

Japanese Laid-Open Patent Publication No. 60-92106 published on May 23, 1985 discloses an independent rear suspension for use on a motor vehicle. The disclosed independent rear suspension generally comprises a knuckle for supporting a wheel, a trailing arm coupled to the knuckle, a pair of front and rear lower arms coupled to the knuckle, and an upper arm coupled to a knuckle arm extending upwardly from the knuckle. The prior independent rear suspension is functionally equivalent to the so-called double wishbone suspension. To protect the joint between the knuckle arm and the upper arm, it is desirable for such joint to swing as small an interval as possible.

SUMMARY OF THE INVENTION

It is an object of the present invention to provide an independent rear suspension designed to minimize the swinging movement of the joint between a knuckle arm and an upper arm.

According to the present invention, there is provided an independent rear suspension for use on a motor vehicle having a vehicle body, comprising a knuckle for supporting a wheel rotatably thereon, a trailing arm having one end rigidly coupled to the knuckle and the opposite end adapted to be pivotally mounted on the vehicle body for pivotal movement about a first pivot, a pair of spaced lower arms pivotally mounted on the knuckle, a knuckle arm extending substantially upwardly from the knuckle, and an upper arm having one end pivotally mounted on the knuckle arm by a ball-and-socket joint and the opposite end adapted to be pivotally mounted on the vehicle body for pivotal movement about a second pivot, the second pivot having a central axis, the extension of which passes substantially through the first pivot. The aforesaid one end of the upper arm has a third pivot about which it is pivotally movable, the third pivot having a central axis, the extension of which is substantially parallel to the extension of the central axis of the second pivot.

When the wheel on the knuckle is moved vertically during travel of the motor vehicle, a triangular plane defined by lines passing through the first, second, and third pivots is turned about the extension of the central axis of the second pivot. Therefore, any swinging movement of the ball-and-socket joint between the knuckle arm and the upper arm is held to a minimum. This is advantageous since the ball-and-socket joint can be easily sealed, highly durable, and less costly to construct and install in position.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
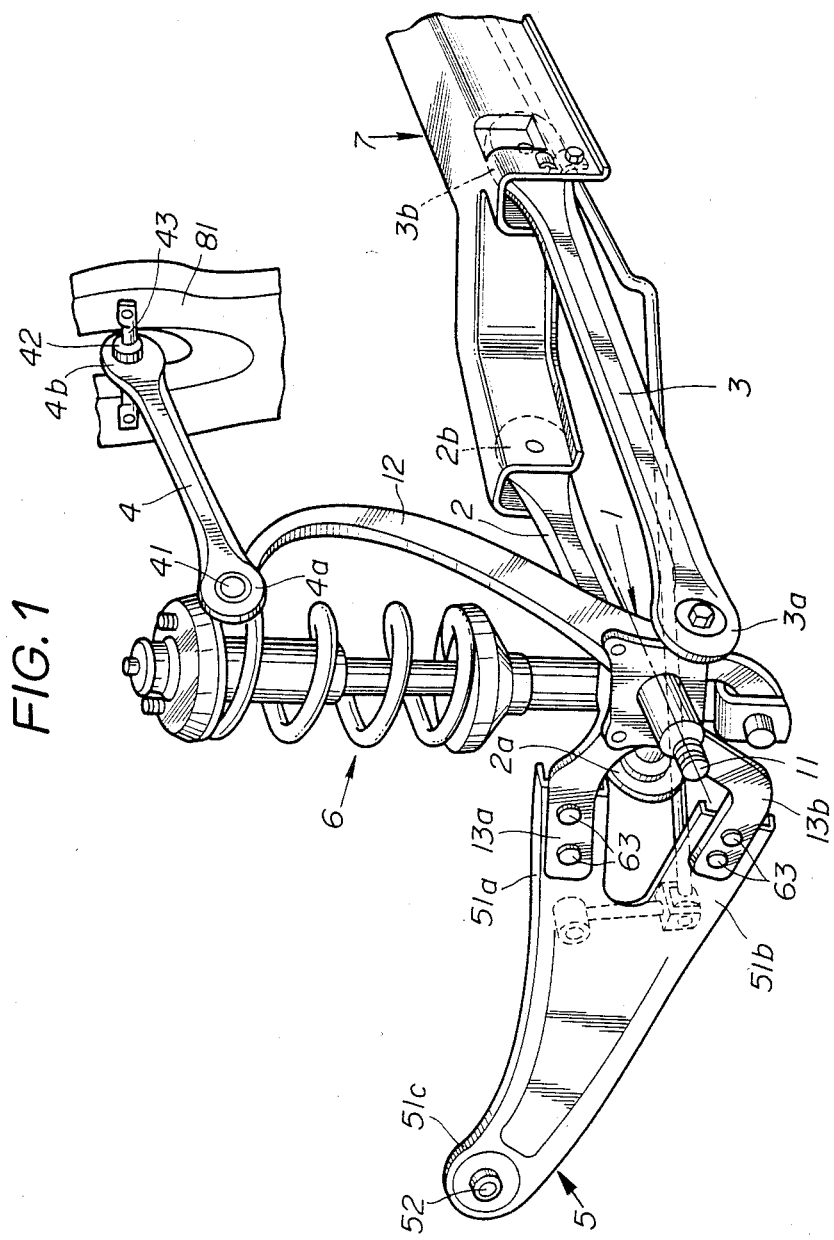
FIG. 1 is a perspective view of an independent rear suspension according to the present invention.
Figure 2:
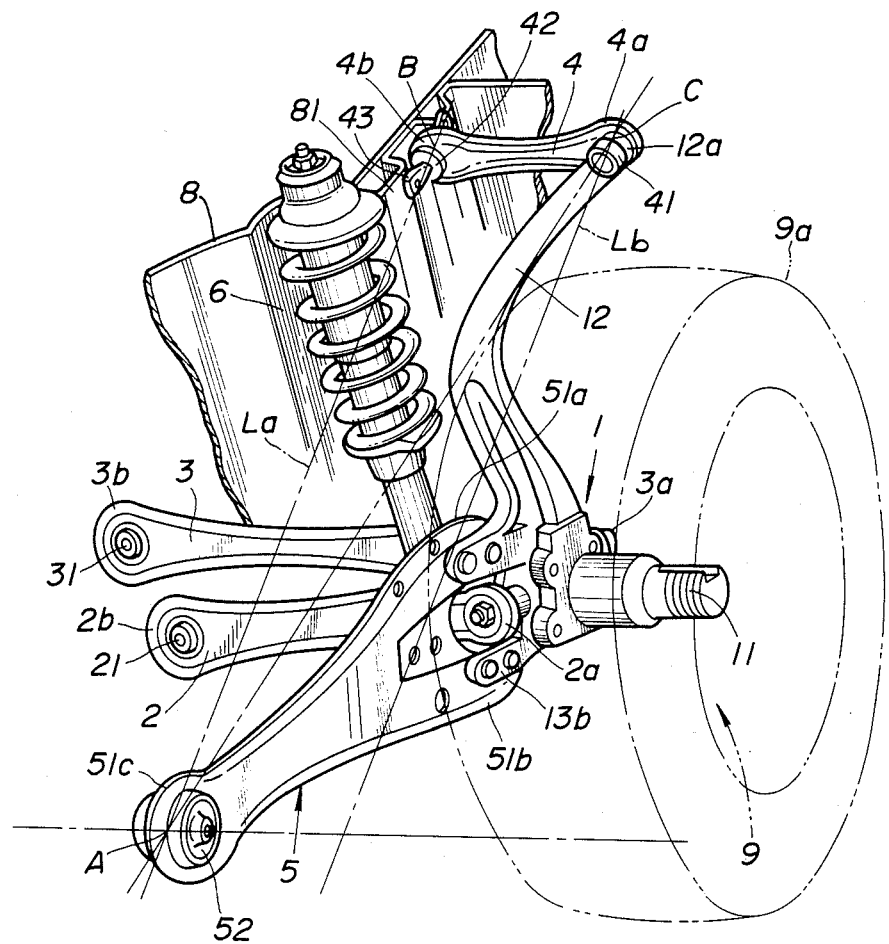
FIG. 2 is another perspective view of the indepenent rear suspension shown in FIG. 1.

As shown in FIGS. 1 and 2, an independent rear suspension for a motor vehicle according to the present invention includes a knuckle 1 having a spindle 11 projecting outwardly from an outer surface thereof. A wheel 9 including a tire 9a is rotatably supported on the spindle 11. The suspension also includes front and rear lower arms 2, 3 spaced from each other and extending transversely across the longitudinal or fore-and-aft direction of the motor vehicle, the front arm 2 being shorter than the rear arm 3. The lower arms 2, 3 have outer ends 2a, 3a pivotally coupled to opposite sides of the knuckle 1. The respective inner ends 2b, 3b of the lower arms 2, 3 are pivotally coupled through elastomeric bushings 21, 31, respectively, to a crossbeam 7 of the vehicle body.

From an upper rear end of the knuckle 1, there extends upwardly a knuckle arm 12 with its upper portion extending rearwardly (to the right in FIG. 1) and inwardly (to the left in FIG. 2). An upper arm 4 has an outer end 4a pivotally coupled to the upper end 12a of the knuckle arm 12 through a ball-and-socket joint 41. The upper end 12a of the knuckle arm 12 is positioned substantially upwardly of the wheel 9. The inner end 4b of the upper arm 4 is pivotally connected to a bracket 81 through an elastomeric bushing 42 by a pivot rod 43 fixed to the bracket 81 which is attached to a wall 8 of a wheel house accommodating the wheel 9.

As shown in FIG. 1, the knuckle 1 has a pair of upper and lower joint arms 13a, 13b extending forwardly from a front side of the knuckle 1. The suspension includes a trailing arm 5 extending in the longitudinal direction of the motor vehicle and lying in a vertical plane. The trailing arm 5 has a pair of upper and lower joint arms 51a, 51b fastened respectively to the joint arms 13a, 13b of the knuckle 1 by means of bolts 63. The trailing arm 5 has a front end 51c pivotally mounted on a vehicle body member (not shown) through an elastomeric bushing 52. The trailing arm 5 is made of a leaf spring material which is highly rigid against bending stresses applied along its plane, and which is sufficiently resilient under forces imposed across its plane.

A hydraulic damper or shock absorber 6 is connected between a vehicle body member (not shown) and the knuckle 1.

As illustrated in FIG. 2, a straight line La which is an extension of the pivot axis about which the inner end 4b of the upper arm 4 is pitotally movable, i.e., the central axis of the pivot rod 43. This line La passes through the point A where the front end 51c of the trailing arm 5 is pivotally connected to the vehicle body member. In addition, a straight line Lb which is an extension of the pivot axis of the outer end 4a of the upper arm 4, i.e., the central axis of the ball-and-socket joint 41, extends parallel to the line La.

As described above, the lower arms 2, 3 and the trailing arm 5 are pivotally coupled to the vehicle body through the elastomeric bushings 21, 31, 52, respectively, and the trailing arm 5 is rigidly coupled to the knuckle 1. When the wheel 9 is moved vertically during travel of the motor vehicle, the knuckle 1 tends to be pulled inwardly with swinging movement of the shorter front lower arm 2. However, such inward movement of the knuckle 1 is forcibly prevented by the trailing arm 5, which is highly rigid in its longitudinal direction. At the same time, reactive forces from the trailing arm 5 are absorbed by the elastomeric bushings 21, 31, 52. Therefore, the wheel 9 is prevented from changing its prest toe in.

Since the trailing arm 5 is securely coupled to the knuckle 1, the knuckle 1 swings with the trailing arm 5 about the pivot point A. Inasmuch as the line La passes through the pivot point A, a triangular plane defined by lines connecting the pivot point A, a pivot point B at which the inner end 4b of the upper arm 4 is pivotally connected to the bracket 81, and a pivot point C at which the outer end 4a of the upper arm 4 is pivotally connected to the knuckle arm 12, turns around the line La. Accordingly, the angle formed between the upper arm 4 and the knuckle arm 12 varies to a small extent when the wheel 9 is moved vertically, with the result that any swinging movement of the ball-and-socket joint 41 is held to a minimum. As a consequence, the ball-and-socket joint 41 can be sealed with greater ease, is more durable, and is less expensive to construct and install in position.

Because the line Lb passing axially through the ball-and-socket joint 41 is parallel to the line La passing axially through the pivot rod 43, the ball-and-socket joint 41 turns only about its own axis in line with the line Lb. This makes the ball-and-socket joint 41 more easy to seal, more durable, and less costly.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

I claim:

1. An independent rear suspension for use on a motor vehicle having a vehicle body, comprising:
    a knuckle for supporting a wheel rotatably thereon;
    a trailing arm having one end rigidly coupled to said knuckle and the opposite end adapted to be pivotally mounted on the vehicle body for pivotal movement about a first pivot;
    a pair of spaced lower arms pivotally mounted on said knuckle;
    a knuckle arm extending substantially upwardly from said knuckle;
    an upper arm having one end pivotally mounted on said knuckle arm and the opposite end adapted to be pivotally mounted on the vehicle body for pivotal movement about a second pivot;
    said second pivot having a central axis, the extension of which passes substantially through said first pivot; and
    said one end of the upper arm has a third pivot about which it is pivotally movable, said third pivot having a central axis, the extension of which is substantially parallel to said extension of the central axis of said second pivot.

2. An independent rear suspension according to claim 1, wherein said one end of the upper arm is pivotally mounted on said knuckle arm through a ball-and-socket joint.

* * * * *

UNITED STATES PATENT AND TRADEMARK OFFICE
CERTIFICATE OF CORRECTION

PATENT NO. : 4,754,992

DATED : July 5, 1988

INVENTOR(S) : Nobuyoshi Asanuma

It is certified that error appears in the above-identified patent and that said Letters Patent is hereby corrected as shown below:

```
Column 2, line 5, correct the spelling of
          --independent--.

Column 2, line 56, change "pitotally" to
          --pivotally--.

Column 3, line 8, change "prest" to --preset--.

Column 3, line 9, change "toe in" to --toe-in--.
```

Signed and Sealed this

Twenty-eighth Day of February, 1989

Attest:

DONALD J. QUIGG

Attesting Officer     Commissioner of Patents and Trademarks